United States Patent [19]

Kato

[11] Patent Number: 5,295,754
[45] Date of Patent: Mar. 22, 1994

[54] FRAMEWORK STRUCTURE FOR WOODEN BUILDING AND FRAMEWORK MEMBER

[75] Inventor: Masao Kato, Yasugi, Japan

[73] Assignee: Kato Sangyo Kabushiki Kaisha, Yasugi, Japan

[21] Appl. No.: 971,031

[22] Filed: Nov. 3, 1992

[30] Foreign Application Priority Data

Apr. 17, 1992 [JP] Japan .................. 4-124344

[51] Int. Cl.⁵ ............................. F16B 9/00
[52] U.S. Cl. ................... 403/174; 52/702; 403/246; 403/252
[58] Field of Search ............ 52/702; 403/174, 178, 403/176, 246, 245, 231, 407.1, 230, 252

[56] References Cited

U.S. PATENT DOCUMENTS

| | | | |
|---|---|---|---|
| 4,004,856 | 1/1977 | Wesseler | 403/252 X |
| 4,068,332 | 1/1978 | Ball et al. | 403/230 X |
| 4,299,509 | 11/1981 | Meickl | 403/174 X |
| 4,439,052 | 3/1984 | Wallther | 403/246 X |
| 4,558,968 | 12/1985 | Meickl | 403/174 |
| 4,863,305 | 9/1989 | Schold | 403/176 X |
| 5,062,733 | 11/1991 | Cholid et al. | 403/246 X |

Primary Examiner—Philip C. Kannan
Attorney, Agent, or Firm—Nikaido, Marmelstein, Murray & Oram

[57] ABSTRACT

A base end of a hook plate is simply inserted into a column surface of a columnar receiving member for fixing. A hook of the hook plate is inserted into an inserted groove provided in an end of a crossing member such as a girder. Further, a bolt passing through the crossing member is received by the hook. As a result, a framework of the receiving member and the crossing member can be fixed. Alternatively, hook plates each having a circular outer periphery and provided in the hooked form are respectively inserted into inserted grooves provided in a receiving member and a crossing member. The respective hook plates are fixed by bolts so as to build a framework.

6 Claims, 12 Drawing Sheets

FRAMEWORK STRUCTURE FOR WOODEN BUILDING AND FRAMEWORK MEMBER

BACKGROUND OF THE INVENTION

1. Field of the Invention

This invention relates to a framework member for wooden building and a framework structure using the framework member.

2. Description of the Prior Art

In general Japanese wooden building, a unique framework method is used to construct structural members. In particular, the parts of each connection are processed to fit, each part of the joint having a complicated and irregular shape with respect to each other. A highly skilled operator is required for such a process.

On the other hand, frameworks such as "lap joint", "shiplap", "box joint" and "butt joint" are frequently built up by using metal fittings in order to simplify conventional framework structures, improve operational efficiency and reduce cost or the like. In the framework using the compound reinforcing metal fittings, however, a large number of metal fittings having complicated construction and a large number of bolts are actually used for junctions of column and beam or the like in actuality.

A complicated processing of the connection is necessary in conventional and traditional framework methods as described above. Accordingly, the conventional methods are undesirable since the highly skilled operator is required for the operation. In addition, there are some drawbacks of high cost, delayed finishing of the construction or the like due to the necessity of many hands. The building operation is disadvantageously complicated and causes frequent troubles during the framework.

On the other hand, a large number of metal fittings or batten plates having a complicated shape and a large number of bolts or the like are used in the framework using construction metal fittings. Therefore, it is not always possible to reduce the amount of time to complete construction and the cost sufficiently. Accuracy of the framework is also insufficient.

SUMMARY OF THE INVENTION

It is an object of the present invention to provide a framework structure and a framework member to overcome these drawbacks.

In order to solve the above problems, a framework structure of the present invention has a framework surface of a columnar receiving member which is arranged in contact with a butt end of another columnar crossing member so as to fix both of the members in a crossing relation, wherein a plate-like framework member is mounted on the receiving member such that one end of the framework member extends from the framework surface and the other end thereof is inserted and secured into the receiving member, and the framework member is inserted into an inserted groove formed in the butt end of the crossing member so as to fix the framework member to the crossing member.

Further, one framework member in the above method comprises a hook formed by providing an engaging groove in the side of an upper end of a hook plate, the engaging groove being used for a dropped bolt passing through the crossing member, a side surface on the side of a pointed end of the engaging groove being formed so as to have an inclined plane toward the pointed end, and a projection having a flange-like anchoring plate secured to an end thereof, and mounted on the side of a base end of the hook plate.

Another framework member comprises a circular periphery of a hook plate made of one plate, an inner peripheral edge notched in the form of hook to provide an entirely hooked framework member, and bolt holes respectively provided in the hooked longitudinal slip and a hooked lateral slip.

The base end of the framework member is attached and secured to the receiving member such as a column such that the framework member can project from the framework surface of the receiving member. The projecting end of the framework member is inserted into the inserted groove which is formed in a butt end of the crossing member such as a beam or a girder butted against the projecting end. Thus, the projecting end can be vertically and laterally positioned. In addition, the crossing member and the projecting end of the framework member are clamped by a bolt to fix the receiving member and the crossing member in the framework.

One framework member is secured to the receiving member by inserting the anchoring plate of the base end of the hook plate into an inserting hole which is used for anchoring the receiving member. The hook of the framework member projects from the framework surface of the receiving member, and is inserted and fitted into the inserted groove formed in a butt end surface of the crossing member. The crossing member is then positioned laterally. At the time, the hook can be vertically positioned by anchoring a bolt passing through the crossing member laterally by the hook. The bolt is dropped into the engaging groove of the hook so that the crossing member can be pushed onto the receiving member.

The other framework member, i.e., the other hook plate is fitted into an inserted groove such that the hook plate can fit the inserted groove having a circular inner peripheral surface on the side of a receiving member. One end of the hook plate projects from the framework surface, and is fixed by bolts in the condition. The projecting end is inserted and fitted into an inserted groove (slit) formed in a crossing member, and is clamped by bolts. Therefore, the receiving member and the crossing member are fixed in the framework.

According to the present invention constructed as set forth above, the following technical effects can be expected.

1. Reduced processing cost and reduced amount of time to complete construction

A skilled operator is not required for the operation and the framework can be built easily and more rapidly since a connection process of column, girder and beam or the like can be simplified and be completely processed by a machine additionally, a pre-cut member can be employed. Further, it is possible to reduce processing cost and labor cost for the framework, and reduce the amount of time to complete construction considerably.

It is also easy to disassemble the structure because of the simple framework structure thereby increasing the degree of recycling of members.

2. Structural member standardized because of lower number of framework members and reduced types of dimensions of structural member and connection processes Since a pattern or a dimension of the framework member is standardized, it is possible to provide a simple and single type of connection process, and to reduce the capital investment in process machinery and equipment. It is further possible to facilitate the stock management of the standardized members, and to reduce the amount of time from the order to delivery. It is easy to grasp the stock management and the cost in the standardized structural members. In conventional ways, it takes more time to estimate members due to a large number of different types of members. Unlike the conventional ways, the standardized members can be advantageously estimated in a moment.

3. Lower destructed and damaged wood sections in joint

In conventional complicated connection processes, there is a high probability of occurrence of lacked member. Accordingly, the conventional connection process has been used with a reinforcing metal fitting. In the present invention, it is possible to reduce the probability of occurrence of lacked member by using the framework member at a position of a newel post having a tenon.

4. Easy adjustment of built-up structure

The column and the girder or the like are joined by a small number of bolts so that adjustment can be completed simply by adjusting these bolts even if the adjustment is desired in a built-up structure.

5. Stronger joint between column and girder by using metal fitting

In conventional framework methods for a wooden building, a rigid joint is provided by using reinforcing metal fittings and clamping the joint by a bolt. Accordingly, it has been difficult to assure accuracy per one millimeter. In the framework member of the present invention, a bolt of an upper stage portion of the girder is slid on a notched portion of a metal fitting. Consequently, it is possible to contact the respective joint surfaces of the column and the girder more tightly, and to fix the respective joint surfaces rigidly with high-accuracy in dimension. In the conventional methods, girth, braced frame, "Shin-kabe" or "0-kabe" should be built to form a wall. Unlike the conventional methods, the high-accuracy of the invention allows forming the wall simply by fitting a light-weight structure wall body (panel) between structural members.

6. Improved degree of freedom in room plan and in extension and reconstruction by using a panel It is possible to reduce the number of columns, increase the degree of freedom in room plan by using a panel as a wall. Further, the increased degree of freedom can be also provided for a modified design in the extension and reconstruction. In addition, the panel can be disassembled easily during the extension and reconstruction.

7. Other effects

It is possible to reduce a diameter of a structural member, to lighten and strengthen a building by using the framework structure and the framework member of the present invention with the structural member made of laminated lumber. The above accuracy of dimension can be further improved, and implementation of the wall using the panel can be more practical.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
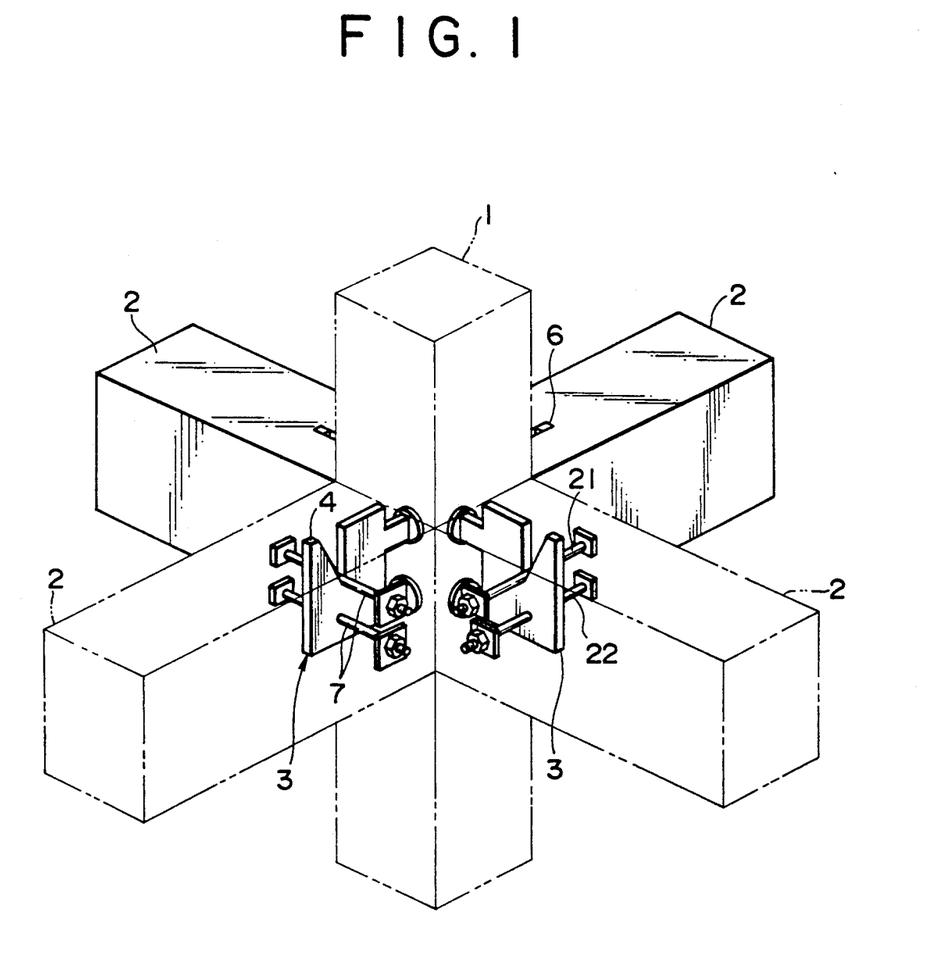
FIG. 1 is a perspective view showing a first embodiment of a framework structure and a framework member.
Figure 2A:
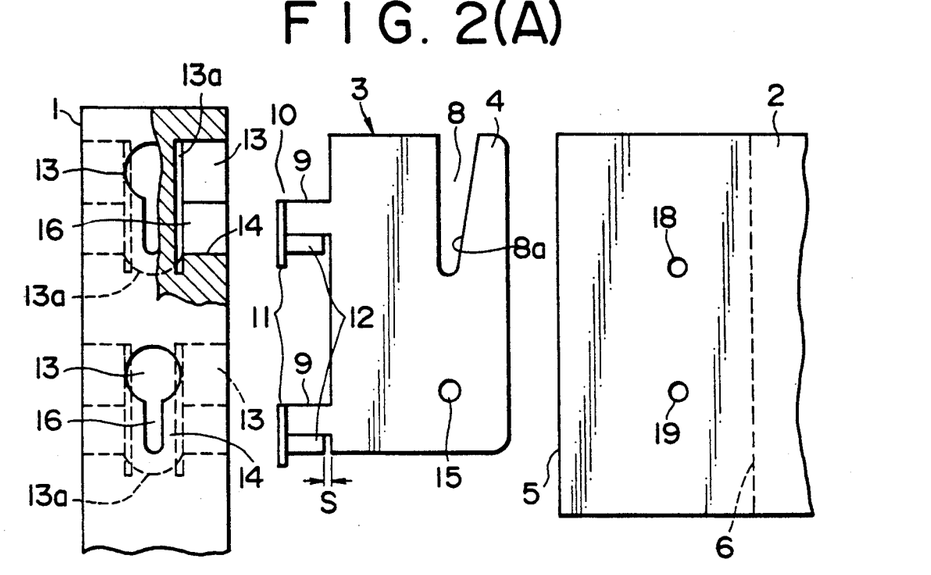
FIGS. 2(A) and (B) are a front view, partly in section, and a plan view showing structures of the framework member and a processed connection, respectively.
Figure 2B:
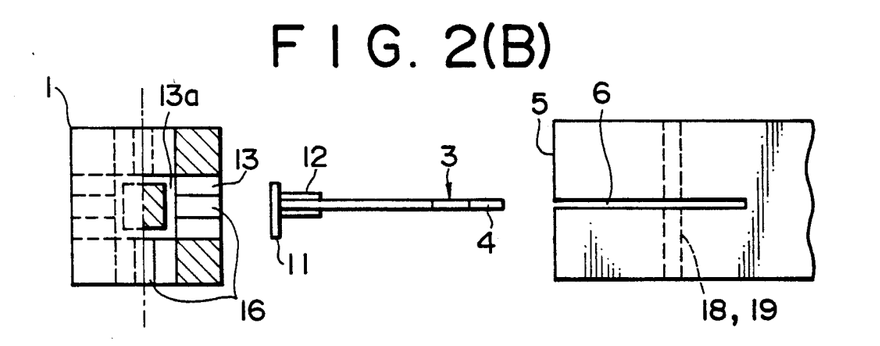
Figure 2C:
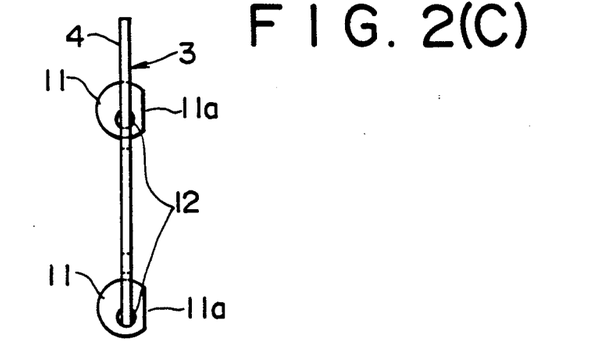
FIG. 2(C) is an end view of the framework member.

The accompanying drawings illustrate two embodiments of a framework structure and a framework member. FIGS. 1 to 3 show a first embodiment. FIG. 1 illustrates an embodiment of a framework in which four crossing members (beams) are arranged in a crossed framework with respect to one receiving member (column) 1. In the framework, butt ends (end faces) 5 of four crossing members 2 are pushed and in contact with four vertical surfaces of the receiving member 1. A hook plate 3 has a base end inserted into each surface of the receiving member 1. A hooked projecting end (hook) 4 of the hook plate 3 is inserted into a slit 6 provided in the butt end of the crossing member 2. Further, bolts 7 passing through the crossing member 2 are anchored by the hook 4 so that the crossing member 2 can be jointed to the receiving member 1.

The hook plate 3 is formed by one steel plate, and the hook 4 is provided at the pointed end of the rectangular hook plate 3 as shown in FIGS. 2(A) to (C). An upper portion of the pointed end of the hook plate 3 is provided with a V-shaped groove 8 having at least an inclined inner surface on the side of the pointed end, for receiving a dropped bolt. Two inserting engaging portions, i.e., an upper engaging portion 10 and a lower engaging portion 10 extend from the base end of the hook plate 3. The engaging portion 10 is provided with a projection 9 projecting from the hook plate 3. A flange-type anchoring plate 11 is secured to a projecting end of the respective projections 9, and is provided with a notch portion 11a vertically notched in one side of an outer periphery of a circular plate. An attachment 12 formed by a pin-type round bar is welded to each lower end of the projections 9. A slight clearance serving as a clamping clearance S between the wood surface of the crossing member 2 and the receiving member 1 is formed between the end surface of the attachment 12 and the base end of the hook plate 3 as will be described later.

Two circular inserting holes 13 are provided in the peripheral surface of the receiving member 1 at the same interval as the upper and lower engaging portions. The anchoring plates 11 of the hook plate 3 are fitted into the inserting holes 13. The inserting hole 13 downwardly extends to a deepest portion thereof such that each fitted and inserted anchoring plate 11 can downwardly slide with the anchoring plate 11 fitted into the inserting hole 13. Inside the deepest portion of the inserting hole 13, there is provided a longitudinally elliptic anchoring hole 13a having the same thickness as that of the anchoring plate 11.

An engaging portion 14 having a predetermined thickness is defined between the anchoring hole 13a and the receiving member 1. A slit 16 has the same width as that of the attachment 12 and is provided in the engaging portion 14 such that the hook plate 3 can be downwardly slid to the lowest position when the anchoring plate 11 is inserted into the deepest portion. A bottom surface of the slit 16 is rounded the same as a bottom surface of the attachment 12, and serves as a receiving surface for receiving a load applied to the projecting end (hook 4) of the hook plate 3 in the same manner as a bottom surface of the anchoring hole 13a. A diameter of the attachment 12 is configured larger than a plate thickness of the projection 9 so as to enlarge an area presented to the pressure of the receiving member 1 with respect to the load applied to the hook plate 3.

The inserting hole 13, the anchoring hole 13e and the slit 16 can be advantageously cut with ease in one step by a milling cutter. The milling cutter includes, for example, a cutter provided in the form of circle identical with the anchoring plate 11, and a cutter (both of which are not shown) having the same form as that of the attachment 12. The former cutter is coaxially and integrally formed with the latter cutter to form the milling cutter.

In the above structure, the slit 6 having the same thickness as that of the hook plate 3 is vertically provided in the butt end 5 of the crossing member 2. The hook plate 3 is inserted and fitted into the slit 6. In addition, the crossing member 2 is laterally provided with bolt holes 18, 19 which pass through the crossing member 2 and correspond to a bottom of the groove 8 for receiving a dropped bolt and a bolt hole 15 provided below the groove 8.

Figure 3A:
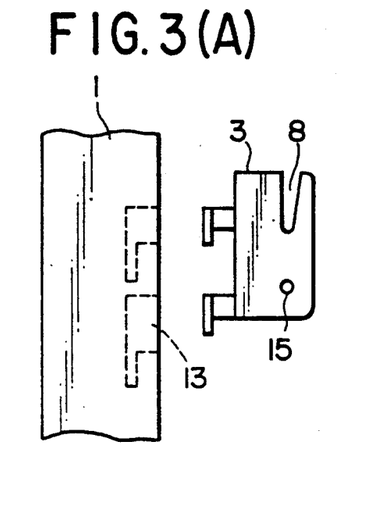
FIGS. 3(A) to (D) are front views showing steps of a framework operation, respectively.
Figure 3B:
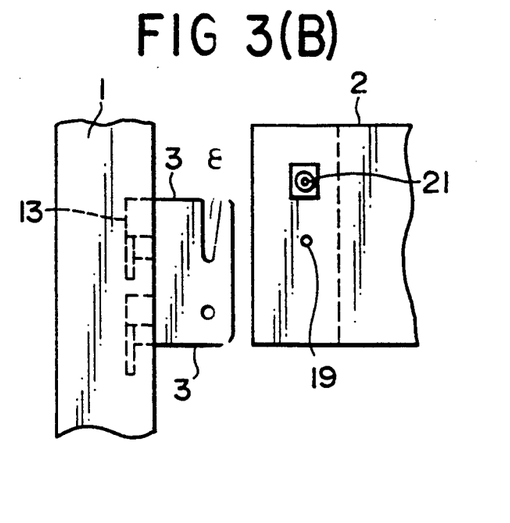
Figure 3C:
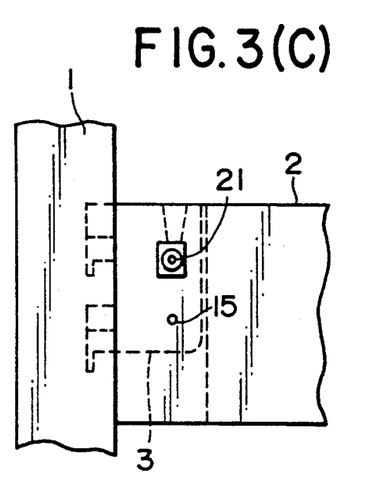
Figure 3D:
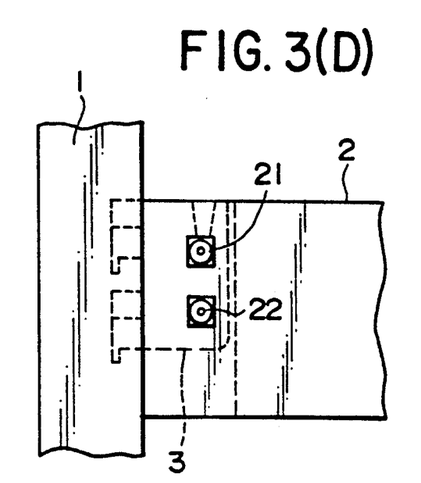

In the framework method according to the structure as set forth above, as shown in FIG. 3(A), the anchoring plate 11 of the hook plate 3 is inserted into the inserting hole 13 of the receiving member 1, and is downwardly slid to the lowest position. Accordingly, the hook plate 3 is anchored by the engaging portion 14 and is fixed in the receiving member 1. Subsequently, the butt end surface 5 of the crossing member 2 is made contact with the column surface of the receiving member 1 while the hook plate 3 is fitted into the slit 6 in a cross state with the bolt 21 passing through the upper bolt hole 18. When the butt end surface 5 of the crossing member 2 is slid downwardly along the column surface, the bolt 21 is lowered and contained in the groove 8 of the hook 4. At the time, while the bolt 21 is guided by an inclined guide surface 8a which is provided at a pointed end of the groove 8, the crossing member 2 is drawn toward the receiving member to press and clamp the crossing member 2 to the receiving member 1. The clearance S between the attachment 12 of the hook plate 3 and the base end surface of the hook plate 3 serves as a clamping clearance between the crossing member 2 and the receiving member.

After the crossing member 2 is positioned in the above operation, the second bolt 22 passed through the bolt holes 19 and 15 to clamp and fix the crossing member 2. An anchoring hole 13 is provided in all the column surfaces of the receiving member 1 of FIG. 2(B) so that the receiving member 1 can receive the crossing members 2 from all directions. The notch portion 11a formed in one side of the anchoring plate 11 is provided so as to prevent interference between the anchoring plates 11 of the hook plates 3 inserted from all directions. Therefore, if the receiving member 1 has a large section, the notch portion 11a is not always necessary since no interference occurs between the anchoring holes 13a themselves.

Figure 4A:
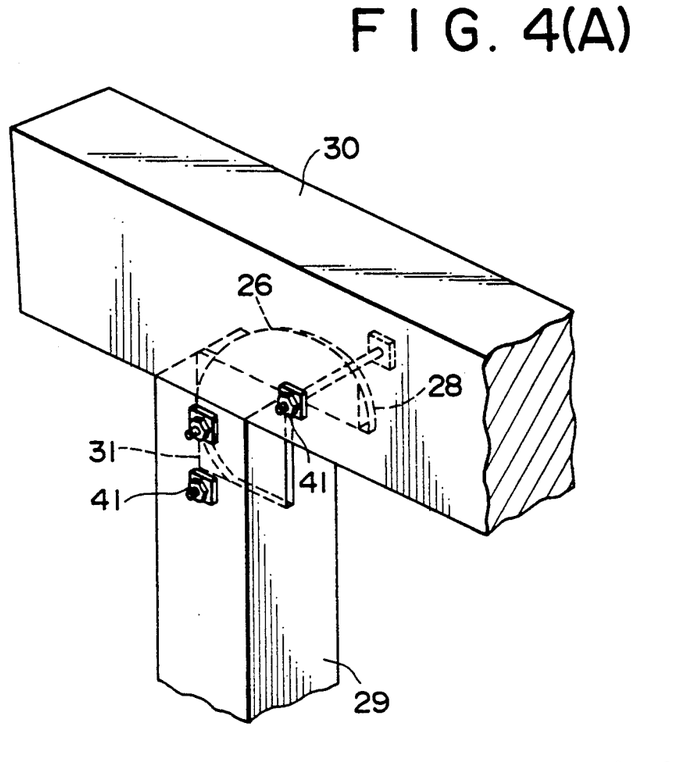
FIGS. 4(A) and (B) are perspective views showing a second embodiment of the framework structure and the framework member, respectively.
Figure 4B:
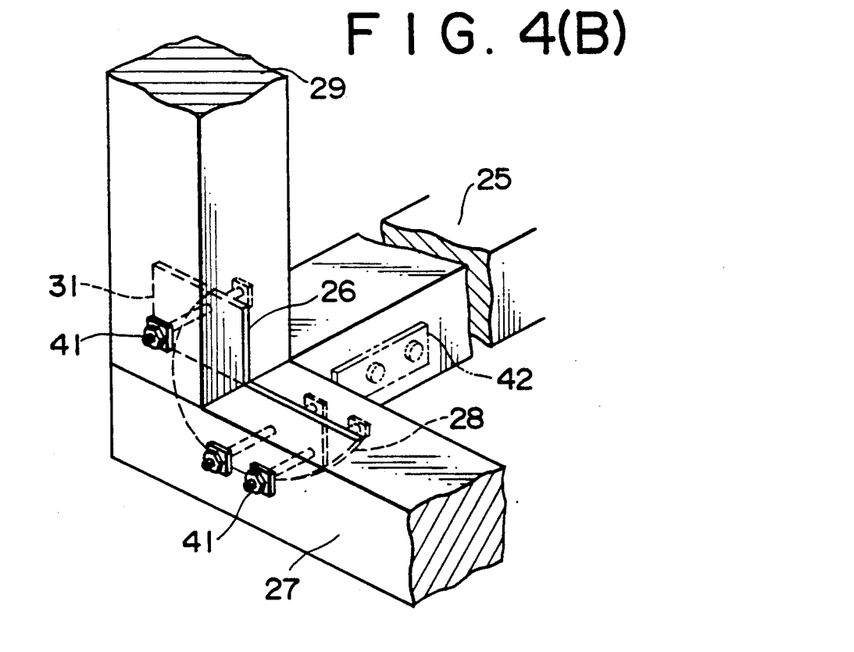
Figure 5A:
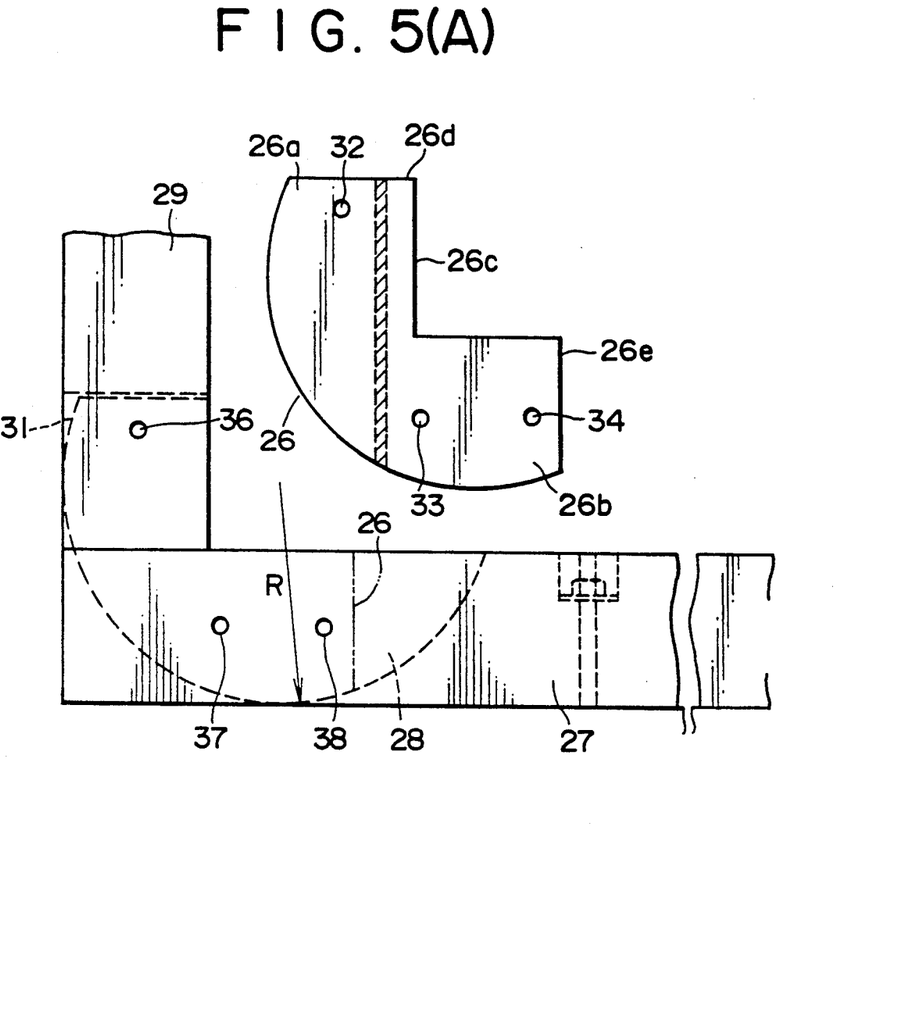
FIG. 5(A) is a front view showing a detailed structure of the framework structure and the framework member, and FIGS. 5(B) (1) and 5(B) (2) are end views of a crossing member and a receiving member, respectively.
Figure 5B:
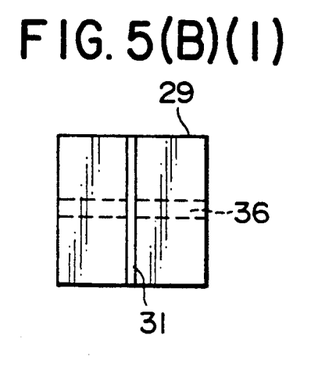

FIGS. 4 to 6 illustrate a second embodiment of a framework structure and a framework member. In the embodiment, as shown in FIG. 5, a hook plate 26 is provided with one steel plate member which has a circular peripheral surface including a radius R. Further, a notch portion 26c is formed by partially notching an outer periphery of the plate member into the form of hook having substantially right angle. Therefore, the hook plate 26 is provided with a longitudinal side 26a and a lateral side 26b. The longitudinal and lateral sides 26a and 26b are respectively provided with notch portions 26d and 26e at pointed ends of both of the sides because of improved yield on material and lightened weight of the hook plate 26.

In the embodiment as shown in FIG. 5, slits 28 and 31 are respectively provided in a receiving member (groundsill) 27 and a crossing member (column) 29 into which the hook plate 26 is inserted and fitted. An inner periphery of the circular slit 28 has the same circular arc as that of the outer periphery of the hook plate 26. A butt end of a lower end of the crossing member 29 is cut to form the slit 31 into which the hook plate 26 is fitted. The slits 28 and 31 can be respectively processed by a saw in one step. In particular, the circular slit 28 can be advantageously processed by using a circular saw in one step.

Bolt holes 32 to 34 and bolt holes 36 to 38 are provided in the longitudinal sides 26a and 26b of the hook plate 26, the receiving member 27 and the crossing member 29 so that the holes 32 to 34 can appropriately correspond to the holes 36 to 38.

Figure 6A:
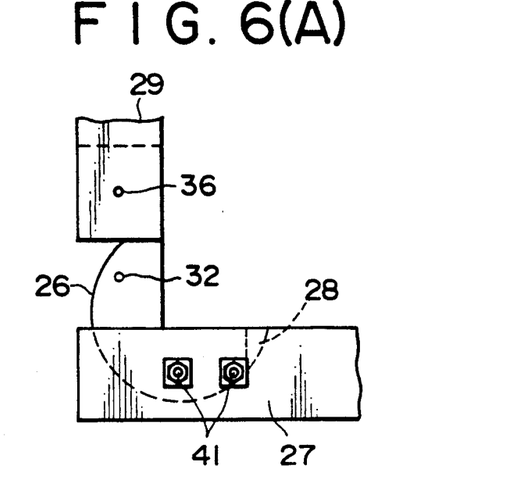
FIGS. 6(A) to (D) are front views showing a framework method according to the second embodiment, respectively.
Figure 6B:
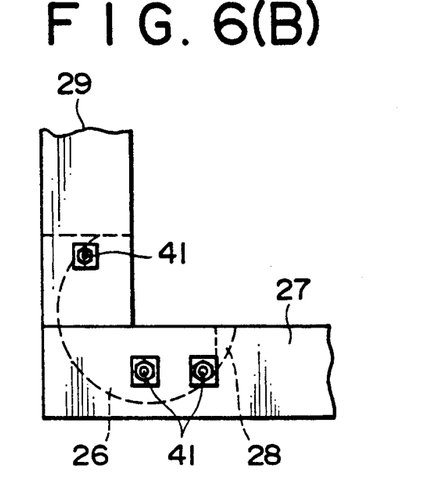

The embodiment as shown in FIG. 5 corresponds to that shown in FIG. 4(B) and FIG. 6(A). As shown in FIGS. 4(B), 6(A), the hook plate 26 is inserted into the slit 28 of the receiving member 27, and is clamped and fixed in advance by two bolts 41 passing through bolt holes 33, 34, 37 and 38. Thereafter, the butt end of the crossing member 29 is lowered so that the hook plate 26 can be inserted into the slit 31. The crossing member 29 and the receiving member 27 are clamped by the bolts 41 passing through the bolt holes 32 and 36. As a result, the framework is completed. The hook plate 26 has a notched surface of the notch portion 26c substantially corresponding to a cross angle or cross surfaces of the crossing member 29 and the receiving member 27 after completion of the framework. Reference numeral 42 designates a strap bolt serving to fix the other groundsill 25 at right angle to the groundsill 27.

Figure 6C:
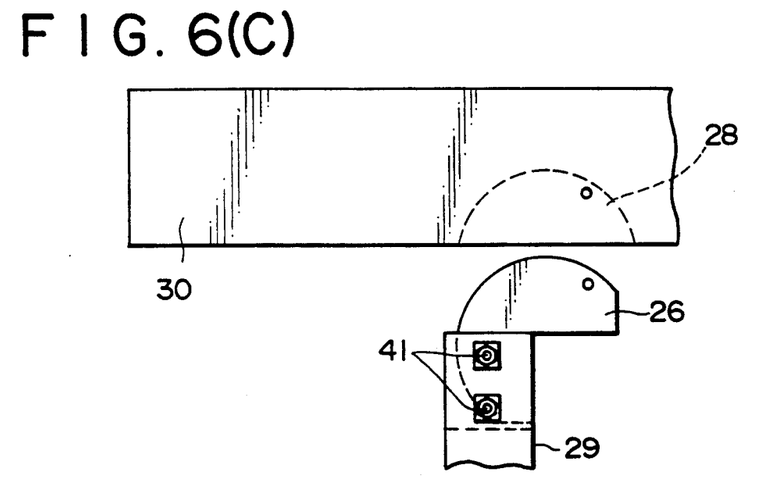
Figure 6D:
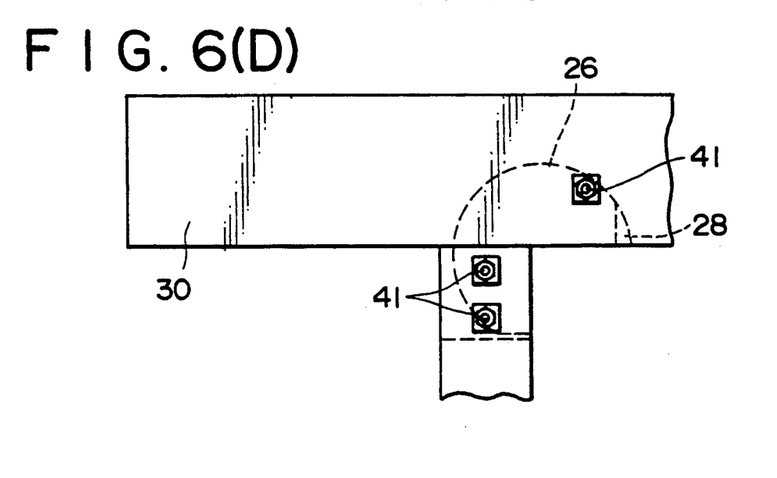

FIG. 4(A), FIGS. 6(C) and (D) illustrate another embodiment in which, for example, the hook plate 26 is applied to mount and fix a beam 30 (crossing member) on an upper end of the column 29 (receiving member). The embodiment includes a reversed relationship between the receiving member and the crossing member with respect to the relationship in FIG. 4(B), FIG. 5, FIGS. 6(A) and (B). That is, the hook plate 26 is clamped by the bolt 41 and mounted on the upper end of the column 29 in advance. Subsequently, the beam 30 is mounted on the upper end of the column 29 such that the upper end of the circular hook plate 26 can be fitted with the slit 31 which has a circular inner periphery formed in the beam 30. The beam 30 is then clamped and fixed by the bolt 41. In either case as set forth above, it is easy to align each member during the framework since the circular outer periphery of the hook plate 26 corresponds to the inner periphery of the slit 28.

Figure 7A:
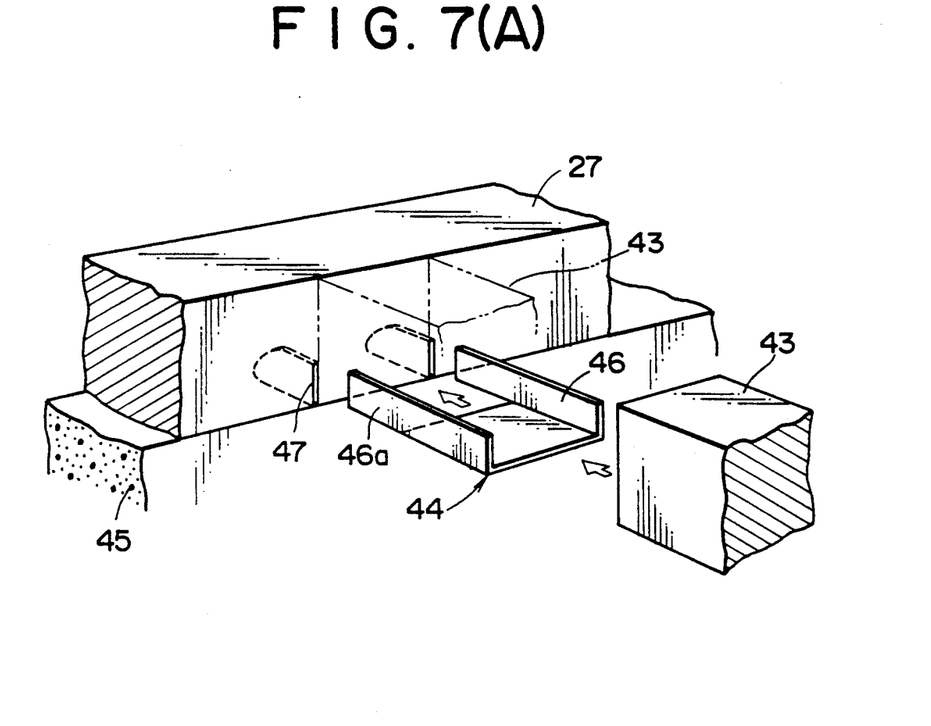
FIGS. 7(A) and (B) are a perspective view and a front sectional view showing a building structure of a groundsill portion of a structure, respectively.
Figure 7B:
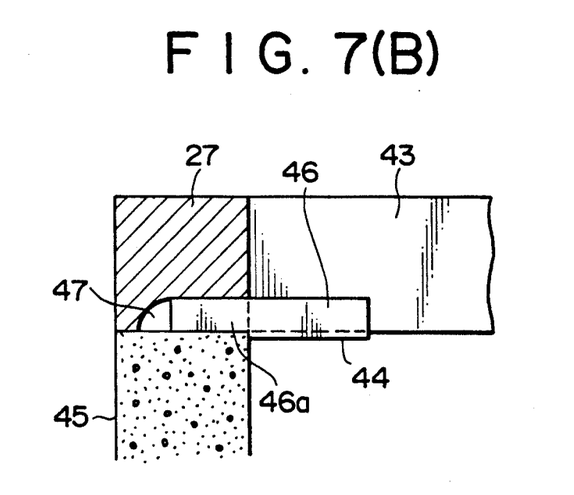
Figure 8:
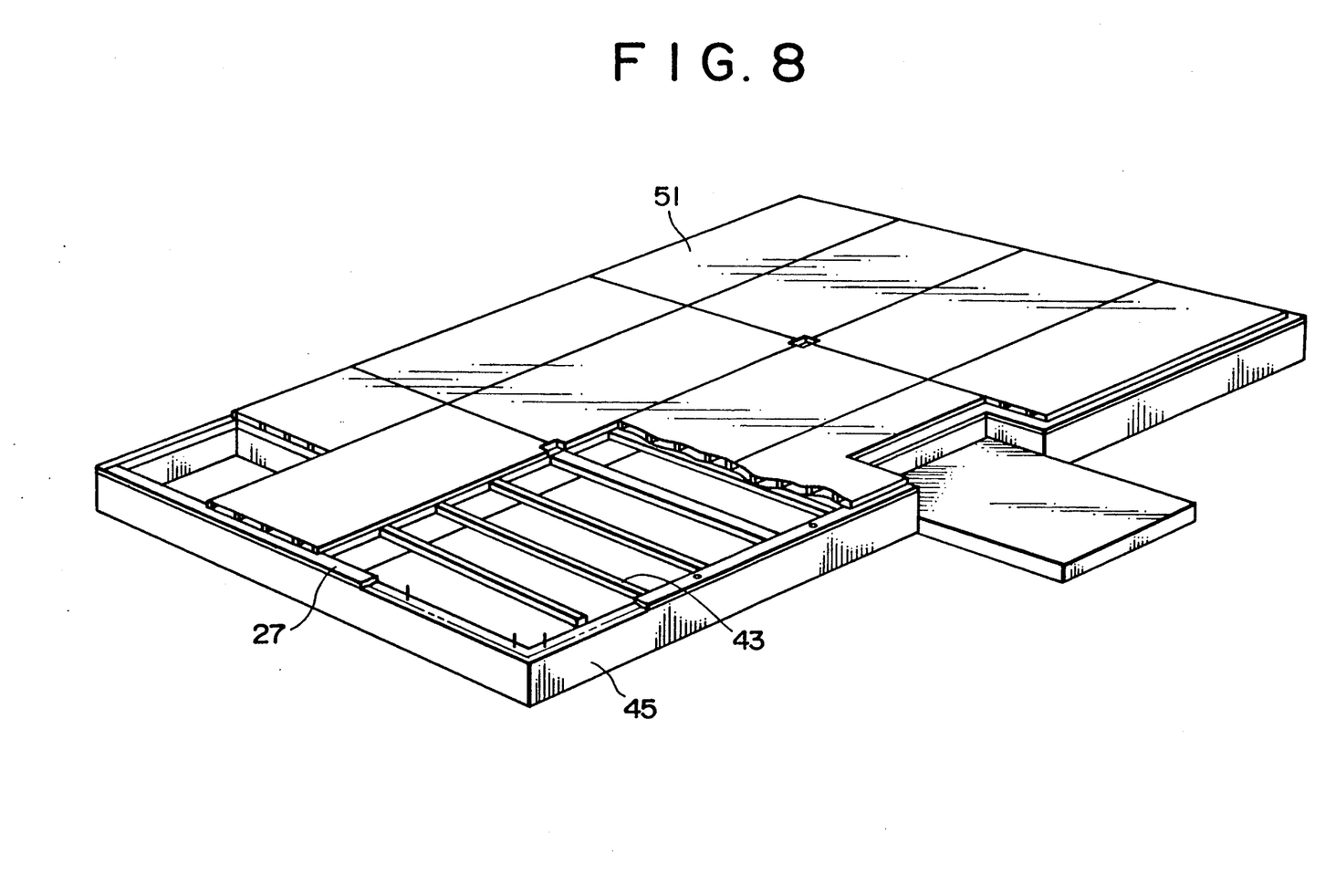
FIG. 8 is a perspective view showing overall the groundsill and a floor construction of the structure.

FIGS. 7(A) and (B) illustrate a joint structure of a common joist 43 with respect to a groundsill 27 mounted and fixed on a concrete foundation 45. A plate 44 having a channel-shaped section contains an end of the common joist 43. A pointed end of a side wall 46 of the plate 44 extends on the side of the end and serves as an inserting end 46a. A bottom of the common joist 43 is provided with two slits 47 into which the inserting end 46a is inserted. As shown in FIG. 7(B), the common joist 43 is mounted on the plate 44 with the inserting end 46a inserted into the slit 47. Thus, the groundsill 27 and the common joist 43 are built and fixed on the foundation 45.

FIGS. 8 to 12 illustrate a building method of a house using the framework structure of the present invention for each step. There is an excellent advantage in that stability of dimension after completion of construction can be ensured by combining, for example, the framework method as described above and dried wood or laminated wood used as the framework member. Therefore, in the embodiment, panels are used as wall wood and floor wood of the house.

Figure 9:
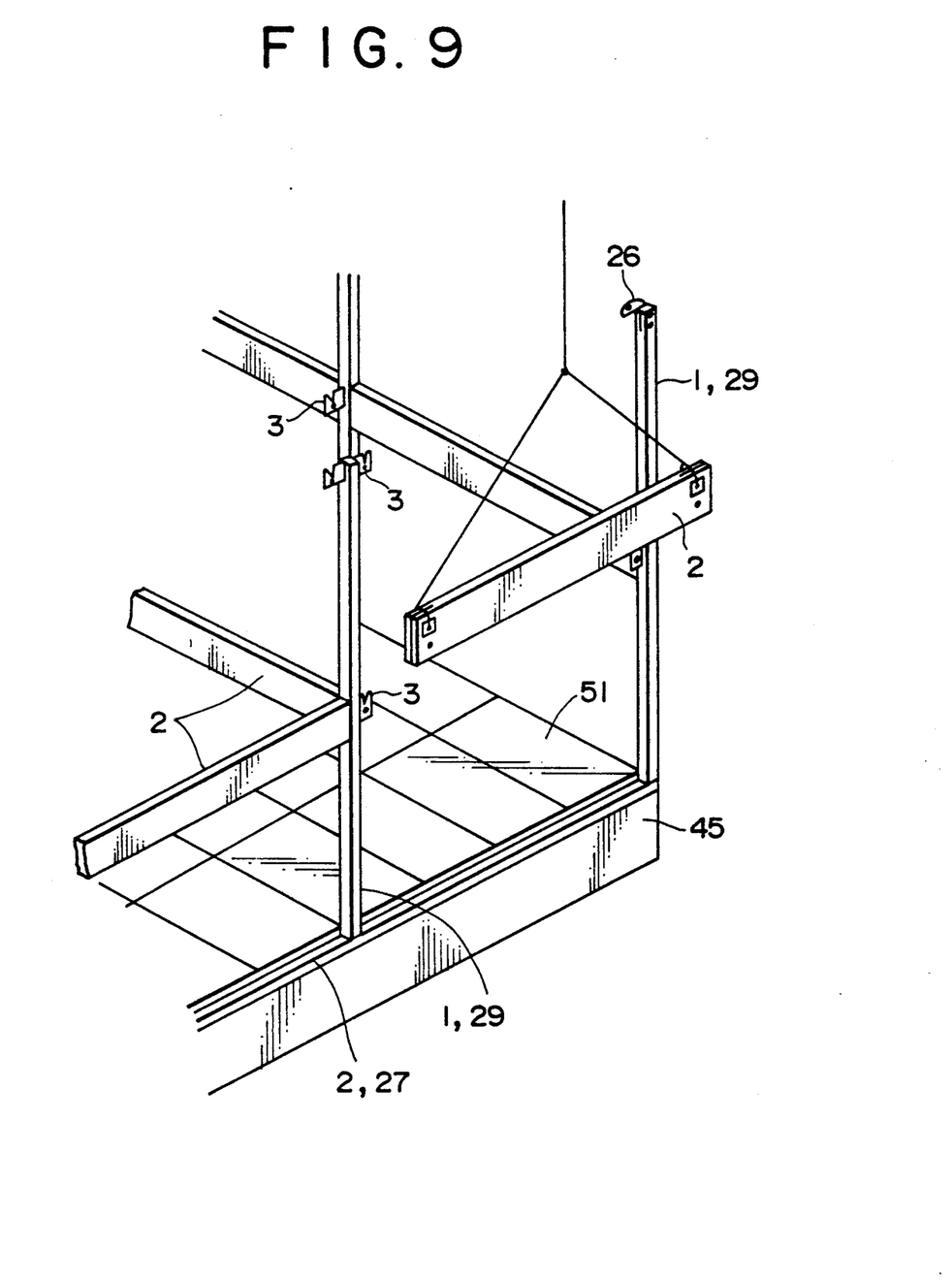
FIG. 9 is a perspective view showing a state of framework operation.
Figure 11:
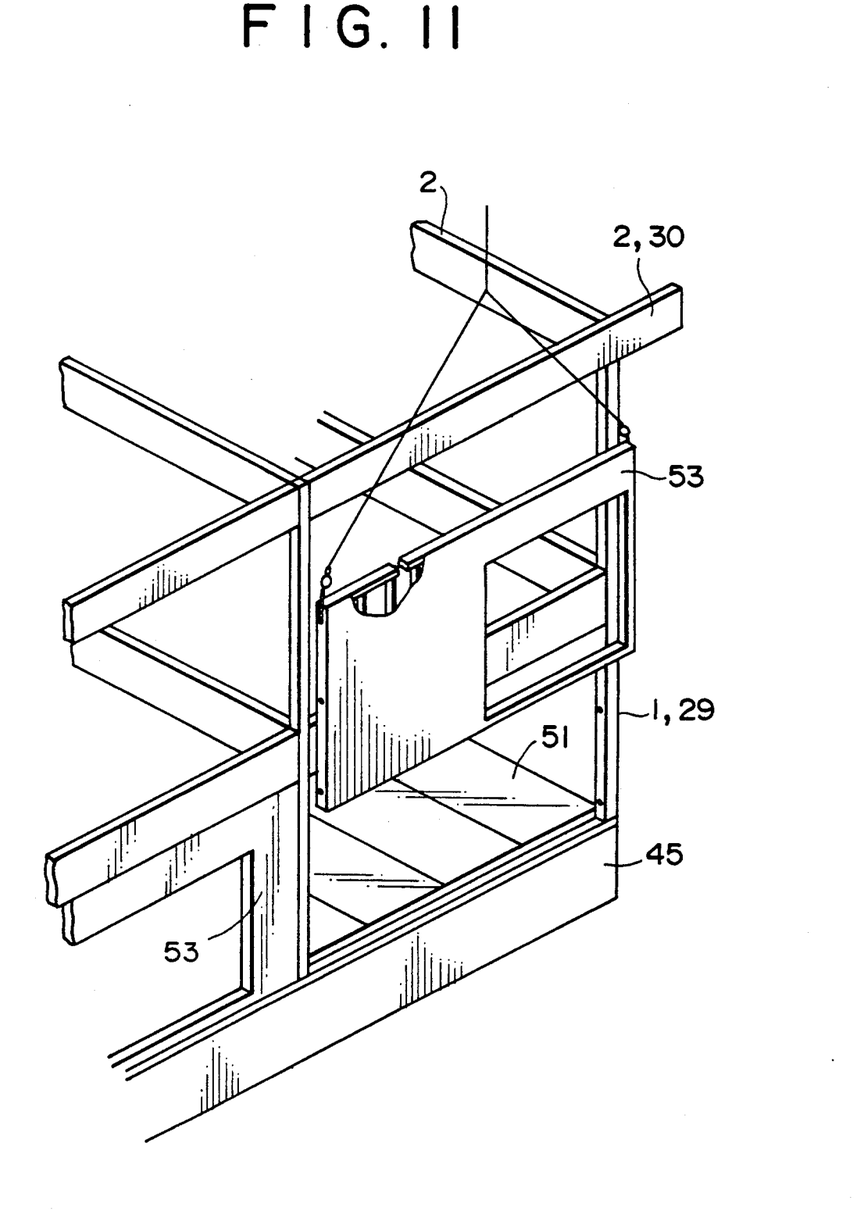
FIG. 11 is a perspective view showing a state of mounting operation of a wall panel.
Figure 12:
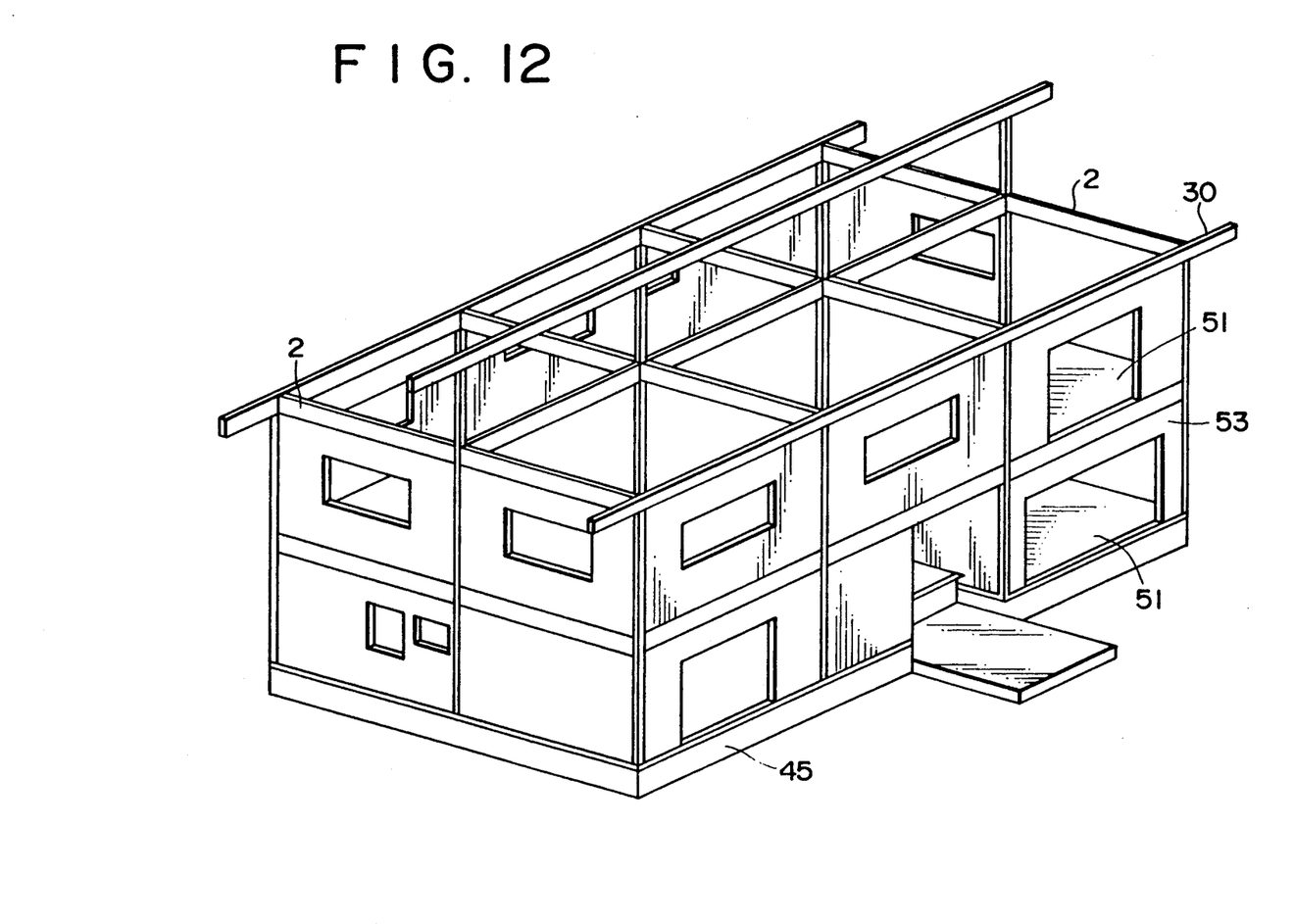
FIG. 12 is a perspective view showing overall a state of building operation of the framework and peripheral walls.

In the embodiment, after the groundsill 27 and the common joist 43 are assembled and fixed onto a concrete foundation 45, a panel type floor wood 51 is underlaid and fixed by using a crane or the like. Next, the framework as shown in FIG. 9 is built by using the hook plates 3, 26 or the like, and the panel type floor wood 51 is further underlaid to form a floorboard of the second floor. As shown in FIG. 11, a peripheral wall 53 or a partition wall or the like is assembled in sequence to be in the condition as shown in FIG. 12 by using the same method as conventional panel method or two-by-four method or the like. A roof member (not shown) can be also assembled by using a panel type member as in the methods.

Figure 10:
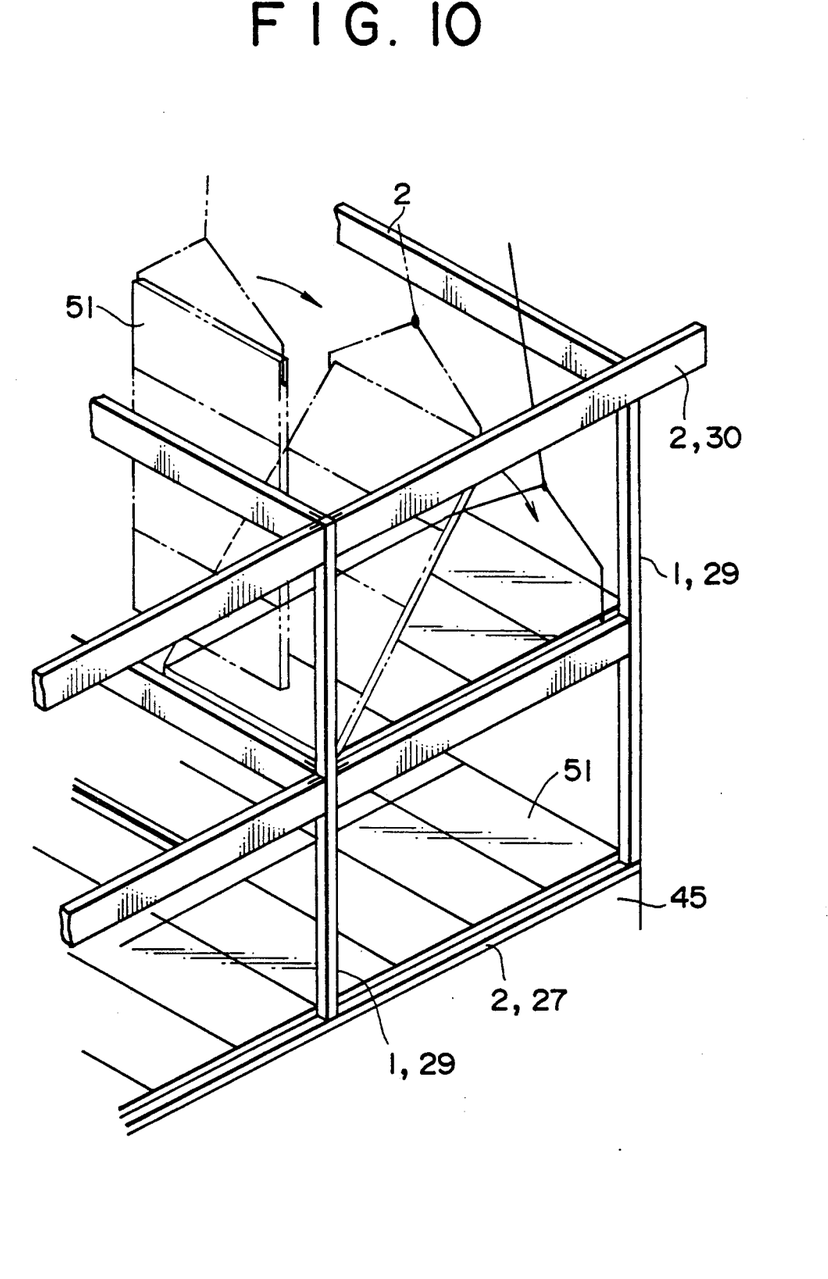
FIG. 10 is a perspective view showing a state of underlaying operation of a floor.

The above building method is characterized in that floor, ceiling, and wall can be all assembled by using panel members. Further, a crane can be used during the building as shown in FIGS. 9 to 11. It is also possible to hand the panel members inside the building even after completion of the framework. As a result, there are some advantages of facilitation of the building operation, improved operational efficiency and rapid operation.

What is claimed is:

1. A framework member for wooden building comprising:

a plate-type hook plate having a base end and a pointed end;

an engaging means for being inserted for anchoring into an inserting hole provided in a framework surface of a columnar receiving member, said engaging means extending from said base end of said hook plate; and an upward hook means formed at said pointed end of said hook plate for being inserted into an inserted groove vertically provided in a butt end surface of a columnar crossing member, said hook means having a groove including an opened upper portion and a bottom for positioning a bolt;

said engaging means including a projection having the same plate thickness as a plate thickness of said hook plate projecting from a surface of said base end of said hook plate, an anchoring plate laterally secured in the direction intersecting an end of said projection, and an attachment formed by a round bar secured along a lower surface of said projection.

2. A framework member for wooden building according to claim 1, wherein said hook plate is composed of a plate-type member having two or more upper and lower engaging means extending from said base end of said hook plate.

3. A framework member for wooden building according to claim 1 or 2, wherein a pointed end of a groove of said hook is provided with an upwardly opened and inclined inner surface.

4. A framework structure for wooden building in which a framework surface of a columnar receiving member is arranged in contact with a butt end of another columnar crossing member so as to fix both members in a crossing condition, and a plate-type framework member is clamped by bolts to said receiving member and said crossing member to connect and fix both members, said framework structure for wooden building comprising:

a plate-type hook plate anchored by inserting an engaging portion of said hook plate into an inserting hole which is provided in said framework surface of said receiving member, and downwardly moving said engaging portion;

said hook plate fitted into a slit provided in a butt end surface of said crossing member;

said bolt laterally passing through said slit to be inserted into said crossing member, and dropped into a groove which is upwardly provided in said hook plate for positioning; and said receiving member and said crossing member being fixed in a framework.

5. A framework structure for wooden building according to claim 4, wherein two or more upper and lower inserting holes of said receiving member and two or more upper and lower inserting engaging portions of said hook plate are provided in parallel with each other.

6. A framework structure for wooden building according to claim 4 or 5, wherein a pointed end of a groove of said hook plate is provided with an upwardly opened and inclined inner surface.

* * * * *